United States Patent
Liu et al.

(10) Patent No.: US 7,853,615 B2
(45) Date of Patent: Dec. 14, 2010

(54) HIERARCHICAL SPACE PARTITIONING FOR SCALABLE DATA DISSEMINATION IN LARGE-SCALE DISTRIBUTED INTERACTIVE APPLICATIONS

(75) Inventors: Zhen Liu, Tarrytown, NY (US); George V. Popescu, Westport, CT (US)

(73) Assignee: International Business Machines Corporation, Armonk, NY (US)

( * ) Notice: Subject to any disclaimer, the term of this patent is extended or adjusted under 35 U.S.C. 154(b) by 544 days.

(21) Appl. No.: 10/933,800

(22) Filed: Sep. 3, 2004

(65) Prior Publication Data

US 2006/0053163 A1 Mar. 9, 2006

(51) Int. Cl.
G06F 7/00 (2006.01)
(52) U.S. Cl. ..................................................... 707/791
(58) Field of Classification Search ................. 709/227, 709/230; 707/103, 791, 793, 798
See application file for complete search history.

(56) References Cited

U.S. PATENT DOCUMENTS

2003/0060216 A1* 3/2003 Kamel et al. ................. 455/457

OTHER PUBLICATIONS

Macedonia et al, Exploiting Reality with Multicast Groups: A Network Architecture for Large-scale Virtual Environments, Virtual Reality Annual International Symposium, Mar. 11-15, 1995, pp. 2-10.*

Kapolka et al, A Unified Framework for Dynamically Extensible Virtual Environments, Collaborative Virtual Environments, Sep. 2002, pp. 64-70.*
Abrams et al, Three-tiered interest management for large-scale virtual environments, ACM symposium on Virtual Reality, 1998, pp. 125-129.*
Lee et al, ATLAS: a scalable network framework for distributed virtual environments, Collaborative Virtual Environments, 2002, pp. 47-54.*
Renesse et al, Astrolabe: A Robust and Scalable Technology for Distributed System Monitoring, Management, and Data Mining, ACM Transactions on Computer Systems, May 2003, pp. 164-190.*

(Continued)

*Primary Examiner*—John R. Cottingham
*Assistant Examiner*—Mohammed R Uddin
(74) *Attorney, Agent, or Firm*—F. Chau & Associates, LLC (57) ABSTRACT

We present exemplary methods involving hierarchical indexing of an application space, and exemplary techniques for scalable management of shared application state update distribution. The application space is partially replicated at each individual client who controls a limited number of static and dynamic objects of the application space. State updates are generated for each modification of objects' dynamic attributes. Multiple dynamic objects may change state simultaneously, requiring dissemination of the state updates to non-overlapping groups of clients. A client's communication interest is described using multiple dynamic attributes. The communication interest space is represented as an N-dimensional attribute space with coordinates spanning the set of dynamic object attributes contained in the communication interest space. We provide a method for partitioning the application space, creation of communication interest cells and hierarchical indexing of the communication interest space. In addition we provide methods for the creation and dynamic modification of the hierarchical index.

17 Claims, 7 Drawing Sheets

OTHER PUBLICATIONS

Logan, Dynamic Interest Management in the Distributed Simulation of Agent-Based Systems, 2000, pp. 1-6.*

Hu, Scalable Peer-to-Peer Networked Virtual Environment, Aug. 30, 2004, ACM, pp. 129-133.*

Tumbde et al, A Voronoi Partitioning Approach to Support Massively Multiplayer Online Games, ACM, Jun. 2004, p. 1-8.*

Antonin Guttman, R-Trees: A Dynamic Index Structure for Spatial Searching, 1984, pp. 47-57.

Katherine L. Morse, et al., Interest Management in Large-Scale Virtual Environments, Presen Feb. 2002, pp. 52-68.

Anton Riabov, et al., Clustering Algorithms for Content-Based Publication-Subscription Syst.

* cited by examiner

Cell1: (ID1, [a11, a12]x[b11,b12]x...)
: {o1,o2,o3,o4,o5,o6}

Cell2: (ID2, [a21, a22]x[b21,b22]x...)
: {o7,o8,o9,o10}

Cell3: (ID3, [a31, a32]x[b31,b32]x...)
: {o11,o12,o13,o14,o15}

HIERARCHICAL SPACE PARTITIONING FOR SCALABLE DATA DISSEMINATION IN LARGE-SCALE DISTRIBUTED INTERACTIVE APPLICATIONS

BACKGROUND OF THE INVENTION

1. Field of the Invention

The present invention relates to distributed interactive applications, and, more particularly, hierarchical space partitioning for scalable data dissemination in large-scale distributed interactive applications.

2. Description of the Related Art

A distributed interactive application ("DIA") allows users connected via a network to interact synchronously with a shared application state. Examples of DIAs include, but are not limited to, networked virtual environments and online multiplayer gaming.

The DIA may be supported by a communication infrastructure which manages the distribution of state updates to objects based on the proximity of the objects in a virtual space. The virtual space is a type of application space. An application space is a collection of objects and their associated states. In the context of the present disclosure, the term "object" refers to a set of static or dynamic attributes and a set of methods that can modify those attributes. The sets of methods and attributes are specific to the application (e.g., for a virtual environment application, the objects have graphical and position attributes and methods that describe their object dynamics). The application space can be partitioned and replicated at several clients in a DIA. A virtual space is a type of application space in which objects are associated with a graphical (typically two- or three-dimensional) representation.

Dynamic attributes of the objects in the virtual space are controlled using state updates. In a distributed virtual space, partitions of the virtual space are replicated at each participating client and controlled locally. The state updates are used to synchronize a locally controlled state among all replicas of a partition.

One method of managing the distribution of state updates is through client subscriptions to the set of states which need to be synchronized. This is commonly referred to as the "communication interest" of a client. The communication interest of a client can be specified using a multidimensional intervals (e.g., a client is interested in all updates that have a position attribute in a specified interval). The union of communication interests of participating clients is commonly referred to as the "communication interest space."

One way to represent the virtual space is by using scene-graphs. However, representation of the virtual space using scene-graphs is not efficient for managing the state of DIAs for at least two reasons. First, although scene-graphs preserve relations between objects (e.g., nodes in a hierarchy of nodes that compose larger structures), scene-graphs do not index the virtual space for efficient spatial queries (e.g., retrieve all objects in the <domain, attributes>). Second, scene-graphs do not provide for dynamic load-balancing of indexed objects.

Alternative representations of the virtual space using spatial data structures (e.g., quad-trees, oct-trees, binary space partitioning) have been proposed, but these structures were designed primarily for rendering (e.g., visibility culling) and physical modeling (e.g., collision checking) operations and do not support the distribution of state updates.

SUMMARY OF THE INVENTION

We present exemplary methods involving hierarchical indexing of an application space, and exemplary techniques for scalable management of shared application state update distribution.

In a first exemplary aspect of the present invention, a method of partitioning a hierarchical space is shown. The method includes partitioning an application space into communication cells. The application space includes a set of objects and its associated states. Each of the set of objects comprising a set of attributes and a set of methods for modifying the set of attributes. The method further includes indexing the communication cells based on the set of attributes; and constructing a hierarchical index by sequential insertion of the communication cells.

In a second exemplary aspect of the present invention, a method of partitioning an application space into a hierarchical structure is shown. The application space includes a set of objects and its associated states. The method includes mapping the application space into hierarchical rectangular cells of variable sizes; and exporting the application space into the hierarchical rectangular cells. The step of mapping satisfies an application-dependent constraint. Each of the hierarchical rectangular cells is associated with a domain defined by a numerical attribute and a non-numerical attribute.

In a third exemplary aspect of the present invention, a machine-readable medium having instructions stored thereon for execution by a processor to perform a method of partitioning a hierarchical space is shown. The method includes partitioning an application space into communication cells. The application space includes a set of objects and its associated states. Each of the set of objects includes a set of attributes and a set of methods for modifying the set of attributes. The method further includes indexing the communication cells based on the set of attributes; and constructing a hierarchical index by sequential insertion of the communication cells.

In a fourth exemplary embodiment of the present invention, a machine-readable medium having instructions stored thereon for execution by a processor to perform a method of partitioning an application space into a hierarchical structure is shown. The application space includes a set of objects and its associated states. The method includes mapping the application space into hierarchical rectangular cells of variable sizes; and exporting the application space into the hierarchical rectangular cells. The step of mapping satisfies an application-dependent constraint. Each of the hierarchical rectangular cells is associated with a domain defined by a numerical attribute and a non-numerical attribute.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Illustrative embodiments of the invention are described below. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims. It should be understood that the systems and methods described herein may be implemented in various forms of hardware, software, firmware, or a combination thereof.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

We present exemplary methods involving hierarchical indexing of a virtual space, and exemplary techniques for scalable management of shared application state update (hereinafter "state update") distribution. The communication interest space (virtual space) may be represented as an N-dimensional attribute space with coordinates spanning the set of dynamic attributes of the objects (hereinafter "dynamic object attributes") contained in the communication interest space. The virtual space may include static and dynamic objects. The static objects have only static attributes. The dynamic objects have static and dynamic attributes. The virtual space is partially replicated at a large number of clients, each of which controls a limited number of static and dynamic objects in the virtual space. Thus, "object replicas" (i.e., another object with the same attributes and methods of a replicated object) are distributed to the clients. State updates are generated for each modification of dynamic attributes. The modifications of dynamic attributes are recorded in a global state (i.e., the union of all states of all objects in the application space) of the virtual space. To maintain a consistent state of the virtual space, the state updates are disseminated to all object replicas maintained by the clients. Multiple dynamic objects may change state simultaneously, requiring dissemination of the state updates to non-overlapping groups of clients.

State updates are disseminated to subsets of the clients according to their communication interest. An exemplary communication interest would be [dynamic attribute A of object X]×[dynamic attribute B of objects with attribute C in the interval [c1, c2]]. The communication interest may be expressed functionally (e.g., updates generated by dynamic objects containing dynamic object attributes which verify a condition specified by the client), or explicitly (e.g., by specifying the dynamic objects containing state updates with which the client is interested). We present three exemplary approaches for managing the communication interests of dynamic objects in the virtual space (i.e., the interest space) to perform efficient state update dissemination:

1. Partitioning the virtual space according to application-specified constraints (e.g., geometry constraints of a 2D space), automatically grouping the clients at run-time, and mapping of the groups to communication cells. This approach involves grouping on static attributes (e.g., clients with attributes in the range [a1, a2] are part of a group mapped to communication cell A) and static mapping to the communication cells.

2. Partitioning the virtual space according to application-specified constraints (e.g., geometry constraints of a 2D space), and dynamically grouping the clients according to run-time communication constraints. In this approach, the communication interest of a client is statically defined, but it includes dynamic attributes. This requires dynamic grouping and mapping of client groups to communication cells.

3. Dynamically grouping the objects according to a client-specified interest. The interest can be specified functionally (e.g., a client interested in state updates from dynamic objects in an area of interest centered at a mobile point in the virtual space), or explicitly (e.g., a client subscribes to state updates generated by specified dynamic objects in the virtual space). In this approach, the communication interest is controlled by the client. The client can change its interest during the lifetime of the application.

To support transparent interest-based group communication for large-scale collaborative and interactive distributed systems, the application space is partitioned into smaller units ("communication cells" or simply "cells") mapped to communication groups indexed in a hierarchical structure. For example, the dynamic indexing structure may be constructed as follows:

1. Static partitioning the application space based on application-specified constraints;
2. Dynamic partitioning the application space based on application-specified constraints and run-time communication constraints; and
3. Dynamic updating client's communication interest.

Examples of application-specified constraints include: (1) all clients with attribute A in the range [a1, a2] are to be included in a single communication group; and (2) group clients such that the total number of groups is minimized. An example of a run-time constraint is: group clients such that the total number of groups is minimized.

The dynamic indexing structure described above is used to manage the client's communication interest, which includes the state of dynamic objects with attributes satisfying a specified property.

Figure 1:
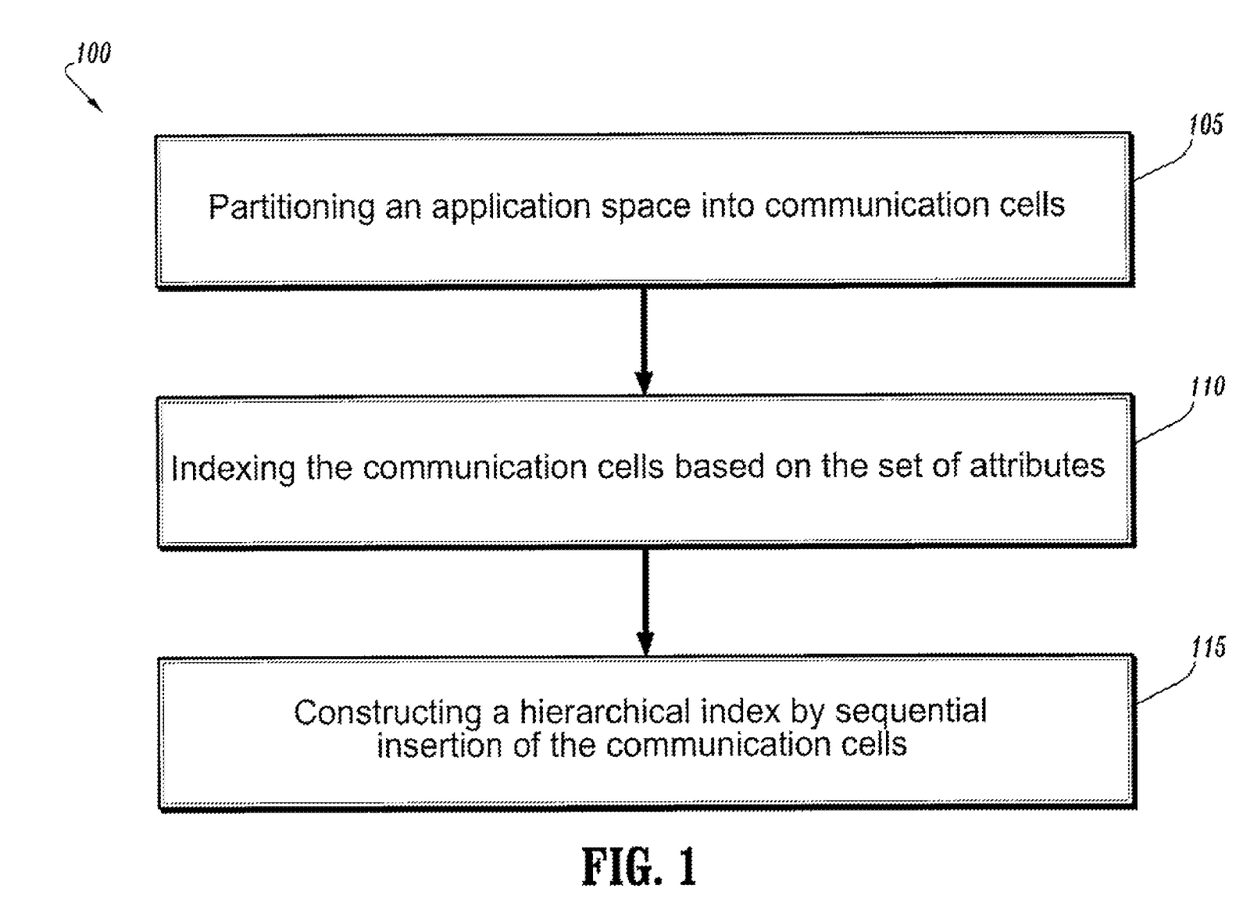
FIG. 1 depicts a flow diagram illustrating a method of partitioning a hierarchical space, in accordance with one exemplary embodiment of the present invention.
Figure 2A:
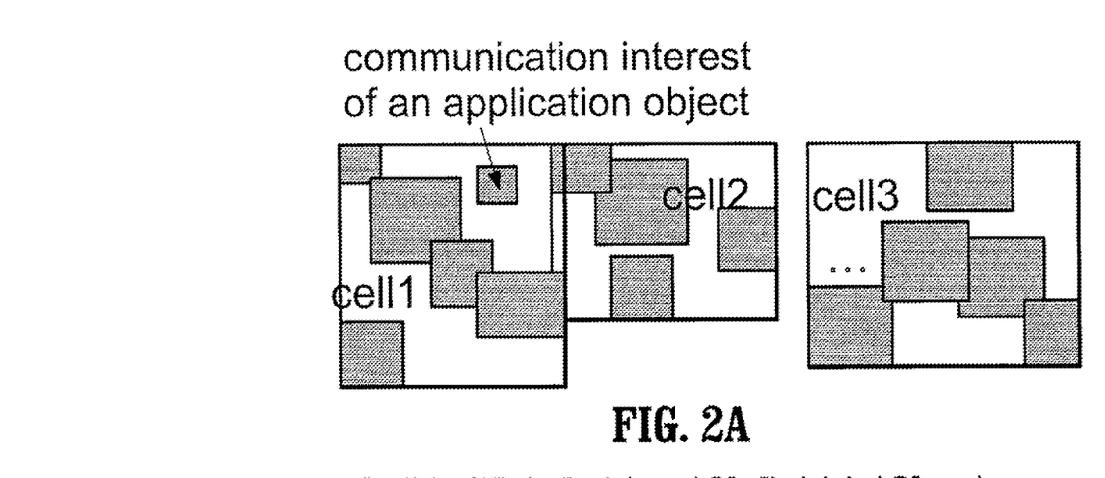
FIG. 2A depicts an application space partitioning, in accordance with one exemplary embodiment of the present invention.
Figure 2B:
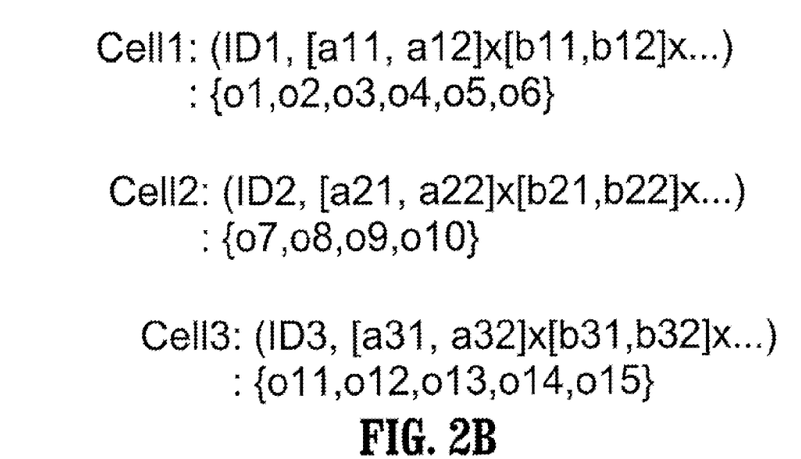
FIG. 2B depicts a communication cell indexing, in accordance with one exemplary embodiment of the present invention.

Referring now to FIG. 1, an exemplary hierarchical space partitioning method is shown. An application space is partitioned (at 105) into communication cells. The application space includes a set of objects and its associated states. Each of the set of objects includes a set of attributes and a set of methods for modifying the set of attributes. An exemplary partitioning of an application space is illustrated in FIG. 2A. The communication cells are indexed (at 110) based on the set of attributes. An exemplary indexing of communication cells is illustrated in FIG. 2B. A hierarchical index is constructed (at 115) by sequential insertion of the communication cells.

Partitioning of the Communication Interest (Virtual Space)

The present method maps a pre-partitioned application space to a hierarchy of cells. An application space is first partitioned such that it satisfies a set of application constraints. The application constraints, such as geometrical constraints, are application dependent (e.g., partitioning of the application space using equally spaced grids in virtual networked simulations). A geometrical constraint is a type of application constraint that applies to two-dimensional or three-dimensional geometries (e.g., all objects in a rectangular area of a two-dimensional grid are mapped to the same communication group). A typical partitioning of a virtual space uses rectangular cells of variable size. Each partition is associated with a domain described by several numerical attributes (e.g., position) and non-numerical attributes (e.g., object type) hashed into numerical values.

The present method exports the pre-partitioned virtual space into a hierarchy of cells. The output of a partitioning process is a partition file, which is an XML document containing a list of partition cells with the corresponding range values. The partitioning process is the process of partitioning the application space. The range value of a partition cell is an interval of the numeric values of the attribute associated with the partition cell. The partitioning file is loaded by a cell manager at runtime. The cell manager parses the partition file to extract the cells, each of which is identified by a unique cell identification (hereinafter "cellID"). Each <cellID, range> pair is then inserted sequentially in the hierarchical structure that manages the communication interest of all participating clients. The cell manager has the additional function of managing the dissemination of state updates; it distributes the state updates addressed to a cell to all the clients whose attributes ranges are included or intersect the attribute range of the cell.

Dynamic Spatial Trees ("DS-Trees")

The application space partition information is indexed in a dynamic spatial tree, which is a hierarchical structure designed for efficient management of communication interest of application objects. A network client is an exemplary application object. It is understood that application objects are not limited to clients. The application space partition information includes the set of application space partitions and the attributes of domains associated with the partitions.

The dynamic spatial tree has the following properties: a) the leaf nodes store lists of objects whose communication interest (e.g., the subscription to an area of the virtual space) are included in the associated partition cell; b) Non-leaf nodes are associated with domains of the application space; c) Tree construction is subject to constraints resulting from the application space hierarchical organization. The fanout of the nodes in the tree as well as the minimum number of children per node is specified by the present method.

Each client is identified by a unique objectID used for distributing the state updates. Each client controls several object replicas, which are associated with the objectID of the client. Objects controlled by a client may be mapped into distinct cells. Each leaf node cell is associated with a group communication session. The session contains a list of all object IDs currently included into the leaf node cell. The list of objectIDs change at run-time as the objects move between different cells. The modification of communication lists is performed by adding (i.e., subscribing) and removing clients at run-time based on the attribute contained in the state updates.

Tree Construction

The following is an exemplary baseline method for tree construction:

1. Start with a division of the attribute space into M cells. This division may be constructed from the virtual space partitioning as described in part 2 below.

Figure 3A:
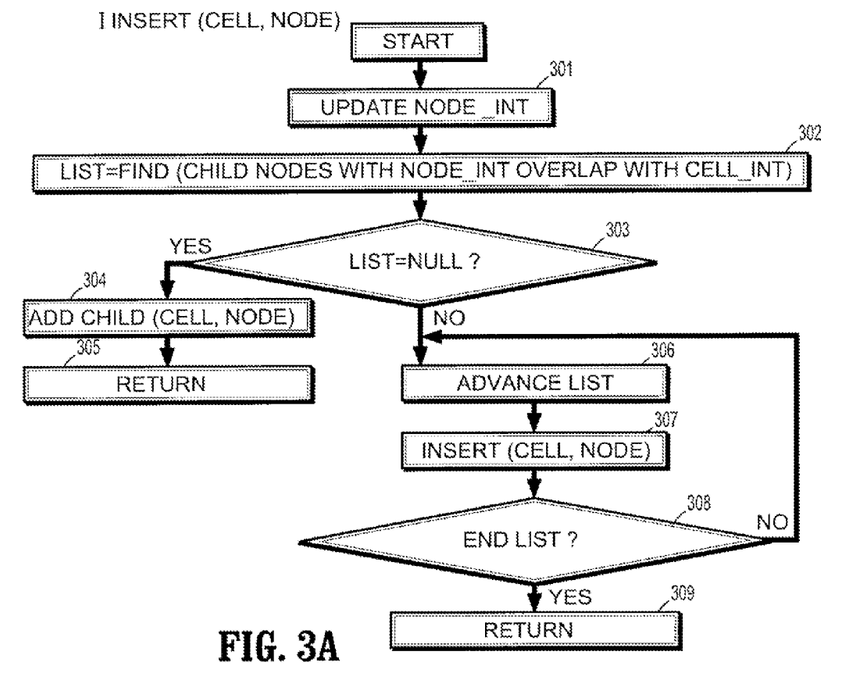
FIG. 3A depicts a flow diagram illustrating an insert operation for tree construction, in accordance with one exemplary embodiment of the present invention.

2. Each cell with a cell ID is associated with a multi-dimensional interval, cellInt. Each node has an associated attribute interval, nodeint. The construction method inserts each object sequentially by checking for overlapping of the object with the areas covered by the nodes in the hierarchy, and splitting the nodes to satisfy the node fanout conditions, Node fanout conditions refer to the inequalities that the degree of the node satisfies (e.g., node degree is smaller than maximum degree of a node.). An example of an insertion operation is illustrated in FIG. 3A. Referring now to the figure, the insertion operation begins at step 301 by updating the attribute interval associated with a current node. NODE_INT. At step 302, a list of those child nodes of the current node whose attribute interval overlaps with multi-dimensional cell interval is generated. If, at step 303, this list is empty, a new child node for the current cell is added at step 304, and the method returns at step 305. If the list is non-empty, the list of child nodes is advanced at step 306 and a new child node for the current cell is inserted into the list at step 307 until the end of the list is reached at step 308. The method returns at step 309.

Figure 3B:
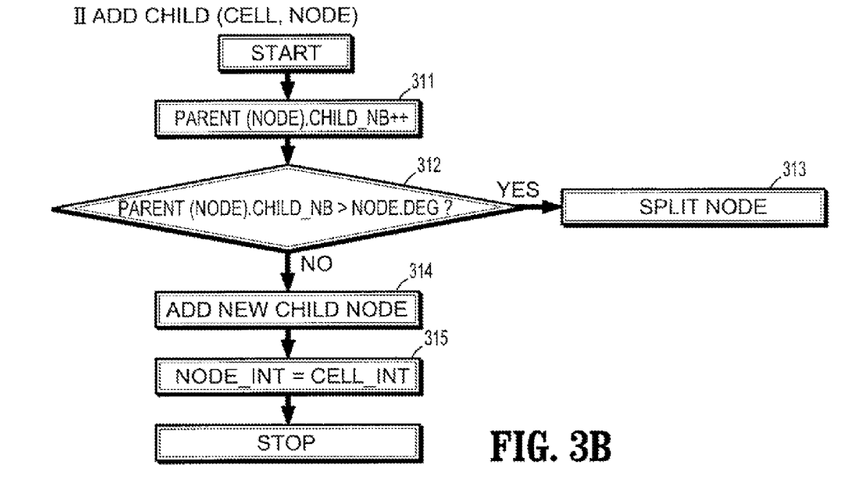
FIG. 3B depicts a flow diagram illustrating an add operation for tree construction, in accordance with one exemplary embodiment of the present invention.

3. Add a new child to the current node if the fanout condition is not violated, or perform load balancing of the nodes. An example of an add operation is illustrated in FIG. 3B. Referring now to the figure, the add operation begins at step 311 by incrementing the number of children of the parent node of the child node being added, represented by PARENT (NODE). CHILD_NB. At step 311, if the updated number of child nodes for the parent node exceeds the maximum allowable node degree, the nodes are split at step 313. Otherwise, at step 314, the new child node is added, and the node attribute interval NODE_INT is set to the cell attribute interval CELL_INT at step 315.

Figure 3C:
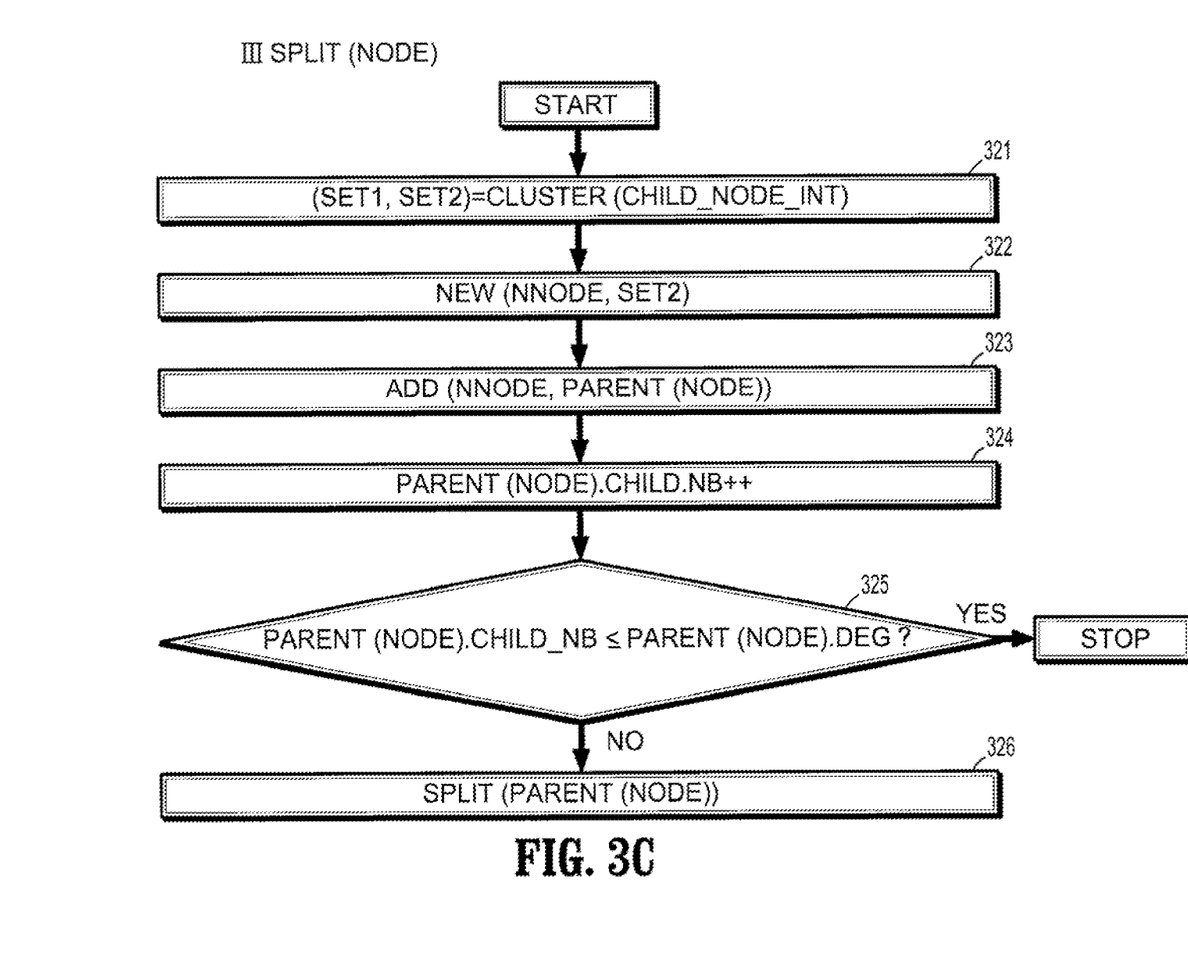
FIG. 3C depicts a flow diagram illustrating a split operation for tree construction, in accordance with one exemplary embodiment of the present invention.

4. Split the node if the degree conditions are violated, and propagate the split up. An example of a split operation is illustrated in FIG. 3C. Referring now to the figure, the split operation begins at step 321 by dividing the set of child nodes whose attribute interval overlaps with cell attribute interval into 2 sets, SET1 and SET2. At step 322, a new node NNODE is allocated for one of the sets, SET2. At step 323, the new node NNODE is added as a parent node for the nodes of SET2, and the number of child nodes for the parent node is incremented at step 324. At step 325, the number of child nodes for the parent node is compared with the maximum allowable node degree, and if it is less, the method stops. Otherwise, at step 326, the split operation is recursively called again.

State Update Management

The hierarchical data structure manages the distribution of state updates to the clients whose interest overlaps with attributes contained in the state update message. In addition to the distribution of state updates, the dynamic interest of client objects can be managed simultaneously using the information contained in the state update message. Upon receiving a state update, a query is propagated in the hierarchical data structure to retrieve the set of clients interested in receiving the update. At the same time, the cells in the hierarchy that overlap with the attributes included in the state update message are modified to reflect the change in position (i.e., interest domain) of the client that propagated the state update.

Figure 4:
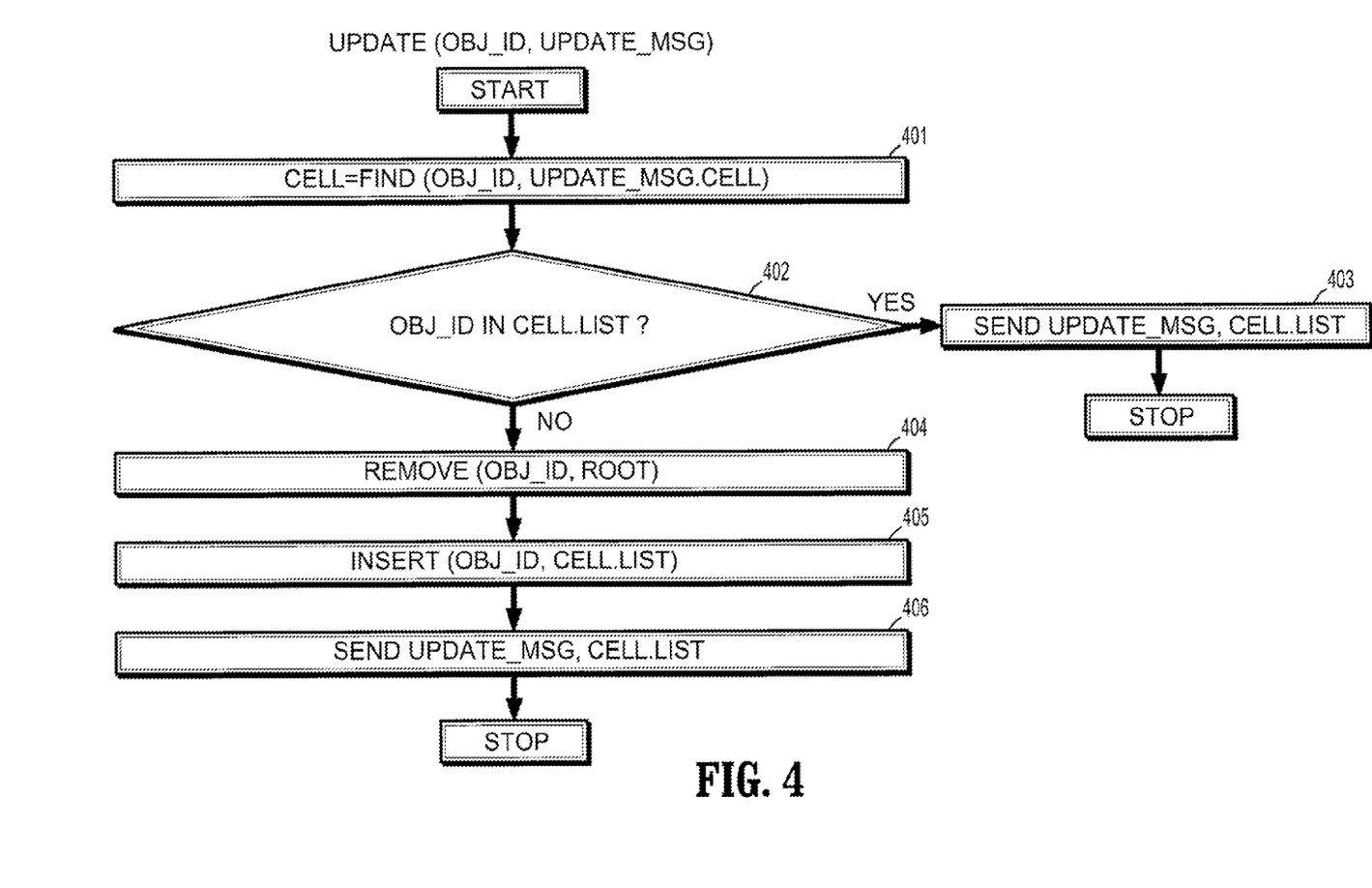
FIG. 4 depicts a flow diagram illustrating a method of updating a hierarchical index, in accordance with one embodiment of the present invention.

The following is an exemplary method for state update distribution and dynamic interest domain modification, as illustrated in FIG. 4:

1. At step 401, locate the cell cellID corresponding to the attributes included in state update message sent by the object with objectID;

2. search objectID in the list of subscriptions of cellID at step 402;

3. if not found, then a. insert the object in the cellID subscription list at step 405; and b. search the objectID in the partition tree and remove it from the previous subscription list at step 404; and 4. send the state update to all receivers in the cellID except the current object at steps 403 and 406.

The search in the tree based on objectID instead of attribute ranges is expensive. The query has to be propagated to all leaf nodes followed by a sequential search of the subscription list of each cell. The overhead of the search is reduced by performing a range query with the attribute interval centered at the attribute values of the object that generated the state update. The search is limited to an attribute range centered at the current cellID, which matches the state update. This range query is guaranteed to overlap with the cells which hold the previous subscription of the object, provided that the allowed changes of the object's attribute between two state updates is upper bounded to the minimum cell size.

As mentioned above, the state updates are messages generated by dynamic objects every time a modification of their attributes occurs. At minimum, the state updates contain the identifier of the object that generated the updates, and the list of <attribute, value> pairs associated with the object. The update may contain a full list of attributes, or a partial list (only attributes that were modified). The update may further contain the full value of the attribute or only the incremental changes. Additionally, the updates may contain time stamps, identity of the sender, etc.

Typically, state updates contain all the attributes of a dynamic object. In this case, the list of objects that are required to receive the update is obtained by performing a point query (i.e., at each level in the partition tree, attributes of an object are matched against the attribute ranges of all node entries) and following the pointer to the matched entry. Attribute ranges queries are performed when the state updates are addressed to a subset of objects specified as a multidimensional interval in the attribute space (e.g., for updating an attribute of all objects within a large domain). In this case, a range query is performed to determine the list of all client addresses where the updates need to be distributed.

In case the state updates do not contain the full list of attributes (i.e., the updates always contain the ID of the object the attributes refer to), the list can be obtained by branching the query to multiple cells that match the transmitted attribute and perform objectID matching at the leaf level. This inefficiency may be removed by caching the <objectID, attributes> for the object the state update refers to. This caching technique can be used for the transmission of delta updates instead of the full attribute values. For centralized state management solutions where the global state of the virtual space is stored at the node that performs the state update distribution, the full object state can be obtained by querying the state management structure.

Methods for DS-Trees Management

One of the innovations of the hierarchical spatial structure presented above is its dynamic behavior. The leaf level nodes of the DS-Tree contain dynamic lists of objects (e.g., clients with common communication interest) which participate in the same communication group. Each node of the spatial tree has degree constraints (e.g., minimum and maximum number of child nodes) as well as a set of external constraints on state update activity of leaf level nodes (e.g., constraints on the total communication bandwidth used by the leaf level nodes in the subtree).

Each node in the hierarchy computes the attribute domain and node activity metric by aggregating the attribute domains and activities of all child nodes. The nodes of the hierarchical structure are split and merged dynamically based on leaf level node state update activity. The splitting of a dynamic spatial tree node comprises clustering clients using a metric based on client interest functional description. Two exemplary methods for dynamic update of the DS-Trees are as follows:

1) periodic tree traversal with node splitting and merging;

2) selective updates triggered by node capacity conditions in the DS-Trees.

Dynamic Tree Management Based on Application and System Constraints

Figure 5:
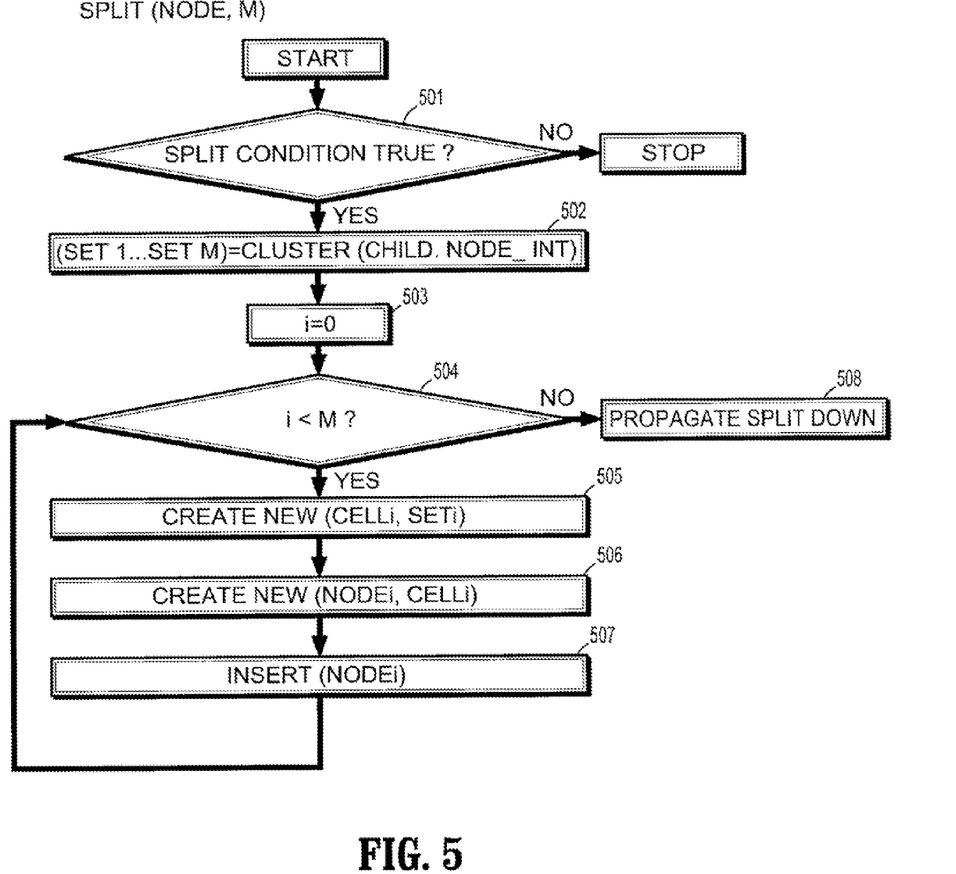
FIG. 5 depicts a flow diagram illustrating a method of splitting a hierarchical index, in accordance with one embodiment of the present invention.
Figure 6:
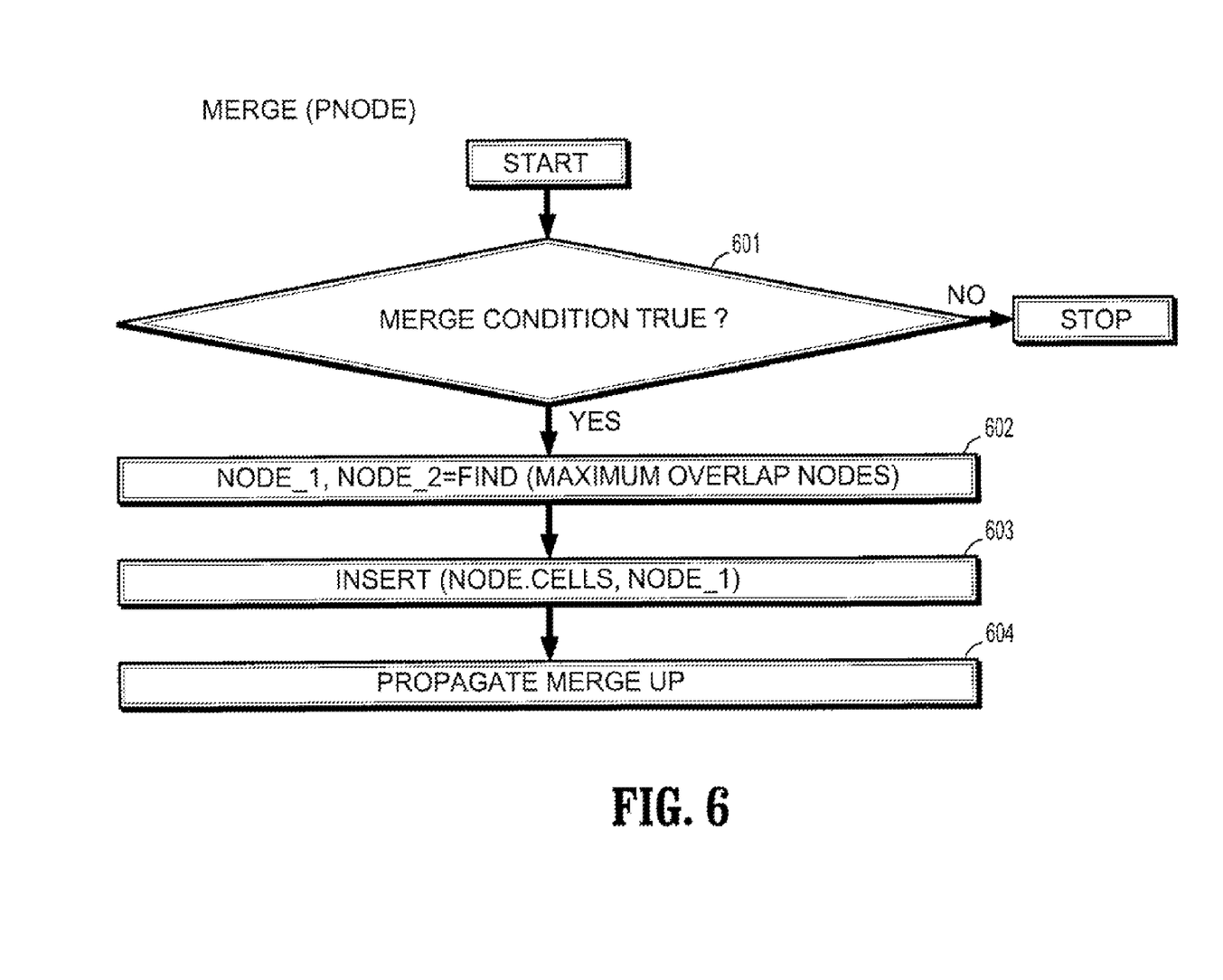
FIG. 6 depicts a flow diagram illustrating a method of merging a hierarchical index, in accordance with one embodiment of the present invention.

Dynamic tree management is performed by splitting/merging tree nodes according to client's communication interest and external conditions on communication capacity. The splitting and grouping is performed dynamically based on monitored capacity of the forwarding node. Nodes are split into disjoint groups of objects such as to minimize an objective function of their attribute values (e.g., position in the virtual space). Splitting and merging are triggered by conditions on the aggregated group communication activity in subtrees of the DS-tree. The following are exemplary methods for splitting and merging of tree nodes, as illustrated in FIGS. 5 and 6, respectively: Split (node, M)

1. if, at step 501, evaluate (trigger expression) (i.e., the split condition is true)
   a. cluster cells at step 502 into M clusters SET1, . . . , SETM such that an objective is minimized;
   b. construct the new cells corresponding to each cluster; and
   c. split the node into M nodes. This involves initializing a counter i at step 503, and creating a new cell for each cluster at step 505 and creating a new node for each cell at step 506. The new node is inserted into the subtree at step 507. At step 504, the counter is tested against the number of clusters, if the counter has reached the number of clusters, then,
2. propagate split down the tree at step 508.

Leaf node splitting into M groups/clusters has the objective of creating groups with minimal overlap. The clustering that minimizes the wasted communication capacity is not part of the present disclosure.

The node merging method:

Merge (p_node):
1. at step 601, while evaluate (trigger expression, p_node) (i.e. the merge condition is true)
   a. at step 602, find (node1, node2) with maximum overlap among the child nodes of the p_node;
   b. at step 604, merge node1 to node2 by reinserting the cells of the smaller degree node to the larger degree node; and
   c. repeat from 1.
2. propagate merge up the subtree at step 605.

The particular embodiments disclosed above are illustrative only, as the invention may be modified and practiced in different but equivalent manners apparent to those skilled in the art having the benefit of the teachings herein. Furthermore, no limitations are intended to the details of design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of dynamically partitioning a hierarchical space of objects representing a dynamic set of participants in a distributed interactive application for managing state updates of said objects, said method comprising:
   partitioning an application space at any point of time into communication cells according to a current state of said application space, the application space comprising an N-dimensional virtual attribute space containing a set of objects and its associated states, and each of the set of objects comprising a set of attributes and a set of methods for modifying the set of attributes, wherein $N \geq 3$, wherein said application space is spanned by coordinates representing said attribute values, wherein said application space is partially replicated in each of a plurality of clients, each of which controls a limited number of static and dynamic objects in the application space;
   grouping the plurality of clients into the communication cells;
   indexing the communication cells based on the set of attributes of objects sharing a communication interest at that time;
   constructing a hierarchical index by sequential insertion of the communication cells; and
   disseminating state updates to subsets of clients according to their communication interests, wherein a state update is generated for each modification of the attributes.

2. The method of claim 1, wherein constructing a hierarchical index by sequential insertion of the communication cells, comprises:
   inserting the set of objects sequentially into a set of nodes;
   adding a child node into the set of nodes; and
   splitting the set of nodes based on a node fanout condition.

3. The method of claim 1, further comprising managing the hierarchical index.

4. The method of claim 3, wherein managing the hierarchical index comprises periodically traversing the hierarchical index by performing node splitting and node merging.

5. The method of claim 4, wherein performing node splitting comprises:
   while a split condition is true,
     (a) clustering the communication cells into M clusters such that an objective is minimized,
     (b) constructing new communication cells corresponding to each of the M clusters, and
     (c) splitting a node into M nodes; and
   propagating part (c) down the hierarchical index.

6. The method of claim 4, wherein performing node merging comprises:
   while a merge condition is true,
     (a) finding a first node and a second node with maximum overlap among child nodes of a p_node,
     (b) merging the first node and the second node by reinserting the communication cells of the first node into the second node, wherein the first node has a smaller degree than the second node, and
   propagating part (b) up the hierarchical index.

7. The method of claim 1, further comprising dynamically modifying the hierarchical index.

8. The method of claim 7, wherein dynamically modifying the hierarchical index comprises:
   locating a cell identification in the communication cells corresponding to an attribute in the set of attributes included in a state update message sent by an object identified by a object identification;
   searching for the object identification in a current subscription list of the cell identification;
   if the object identification is not found in the step of searching, then
     (a) inserting the object identified by the object identification into the current subscription list of the cell identification, and
     (b) searching for the object identification in the hierarchical index, and,
   if the object identification is found in a previous subscription list,
     removing the object identification from the previous subscription list; and
   sending the state update message to all objects identified in the subscription list of the cell identification.

9. A method of dynamically partitioning an application space into a hierarchical structure for managing state updates of a dynamic set of objects, the application space comprising an N-dimensional virtual attribute space containing said set of objects and its associated states, wherein $N \geq 3$, wherein said application space is spanned by coordinates representing attribute values of said objects, the objects representing participants in a distributed interactive application, the method comprising:
   mapping the application space at any point of time into hierarchical hyperrectangular cells of variable sizes according to a current state of said application space; and exporting the application space into the hierarchical hyperrectangular cells;
wherein said hierarchical structure comprises leaf nodes storing lists of objects whose communication interest are included in the associated partition cell and non-leaf nodes associated with domains of the application space;
wherein the step of mapping satisfies an application-dependent constraint; and
wherein each of the hierarchical hyperrectangular cells is associated with a domain defined by a numerical attribute and a non-numerical attribute of an object at that time.

10. The method of claim 9, wherein the application-dependent constraint comprises a constraint that the application space be partitioned into equally-spaced grids in a virtual networked simulation.

11. The method of claim 9, wherein the application-dependent constraint comprises a geometrical constraint.

12. The method of claim 9, wherein the numerical attribute comprises a position of at least one object in the set of objects.

13. The method of claim 9, wherein the non-numerical attribute comprises an object type of at least one object in the set of objects.

14. The method of claim 9, further comprising creating a partition file,
the partition file comprising a list of the hyperrectangular cells with corresponding range values,
the list comprising unique cell identifications corresponding with the hyperrectangular cells,
the range values comprising intervals of numerical values of the numerical attributes and the non-numeric attributes associated with the corresponding partition cells.

15. The method of claim 14, wherein the partition file is exported to an XML document.

16. A computer-readable hardware medium having instructions stored thereon for execution by a computer processor to perform a method of dynamically partitioning a hierarchical space of objects representing a dynamic set of participants in a distributed interactive application for managing state updates of said objects, said method comprising:
partitioning an application space at any point of time into communication cells according to a current state of said application space, the application space comprising an N-dimensional virtual attribute space containing a set of objects and its associated states, and each of the set of objects comprising a set of attributes and a set of methods for modifying the set of attributes, wherein $N \geq 3$, wherein said application space is spanned by coordinates representing said attribute values, wherein said application space is partially replicated in each of a plurality of clients, each of which controls a limited number of static and dynamic objects in the application space;
indexing the communication cells based on the set of attributes of the objects at that time;
constructing a hierarchical index by sequential insertion of the communication cells; and
dynamically modifying the hierarchical index, including
locating a cell identification in the communication cells corresponding to an attribute in the set of attributes included in a state update message sent by an object identified by a object identification;
searching for the object identification in a current subscription list of the cell identification;
if the object identification is not found in the step of searching, then
(a) inserting the object identified by the object identification into the current subscription list of the cell identification, and
(b) searching for the object identification in the hierarchical index, and,
if the object identification is found in a previous subscription list,
removing the object identification from the previous subscription list; and
sending the state update message to all objects identified in the subscription list of the cell identification.

17. A computer-readable hardware medium having instructions stored thereon for execution by a computer processor to perform a method of dynamically partitioning an application space into a hierarchical structure for managing state updates of a dynamic set of objects, the application space comprising an N-dimensional virtual attribute space containing said set of objects and its associated states, wherein $N \geq 3$, wherein said application space is spanned by coordinates representing attribute values of said objects, the objects representing participants in a distributed interactive application, the method comprising:
mapping the application space at any point of time into hierarchical hyperrectangular cells of variable sizes according to a current state of said application space; and
exporting the application space into the hierarchical hyperrectangular cells;
wherein said hierarchical structure comprises leaf nodes storing lists of objects whose communication interest are included in the associated partition cell and non-leaf nodes associated with domains of the application space;
wherein the step of mapping satisfies an application-dependent constraint; and
wherein each of the hierarchical hyperrectangular cells is associated with a domain defined by a numerical attribute and a non-numerical attribute of an object at that time.

* * * * *